April 4, 1950 B. J. PAULSON 2,502,985

CLOCK

Filed May 8, 1945

INVENTOR.
BERNARD J. PAULSON
BY
Christian R. Nielsen
ATTORNEY.

Patented Apr. 4, 1950

2,502,985

UNITED STATES PATENT OFFICE 2,502,985

CLOCK

Bernard J. Paulson, Waukesha, Wis.

Application May 8, 1945, Serial No. 592,679

1 Claim. (Cl. 58—50)

My invention relates to clocks, and more particularly to a clock having a dial in which the numerals and the indicators, only, are illuminated to afford visibility.

The object of my invention is to provide a conventional clock, in which a plurality of discs made of transparent or translucent material are disposed one behind the other and permitted to revolve in relation to a stationary dial.

Another object of my invention is to cover portions of the various discs with opaque material so that only certain portions thereof are transparent and illuminated.

Still another object is to provide illumination around the entire radial face of the dial so that the light is distributed over the entire face.

A still further object of my invention is to provide indicators for the clock that do not cross one another or the numerals at any point on the dial.

Other and further objects of my invention will become more apparent as the description proceeds when taken in conjunction with the drawings, in which.

Figure 1:
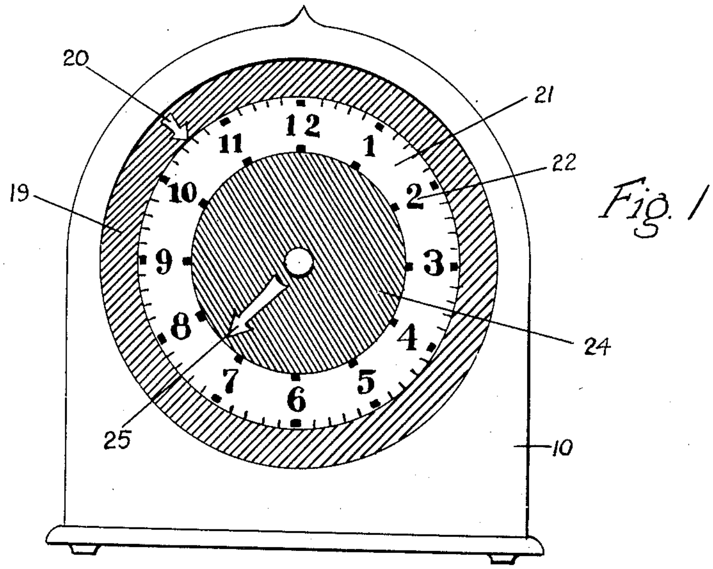
Figure 1 is a front face of the entire clock, illustrating the manner of arranging the indicator hands with respect to the numerals on the face of the clock.
Figures 2, 3, 4, 5:
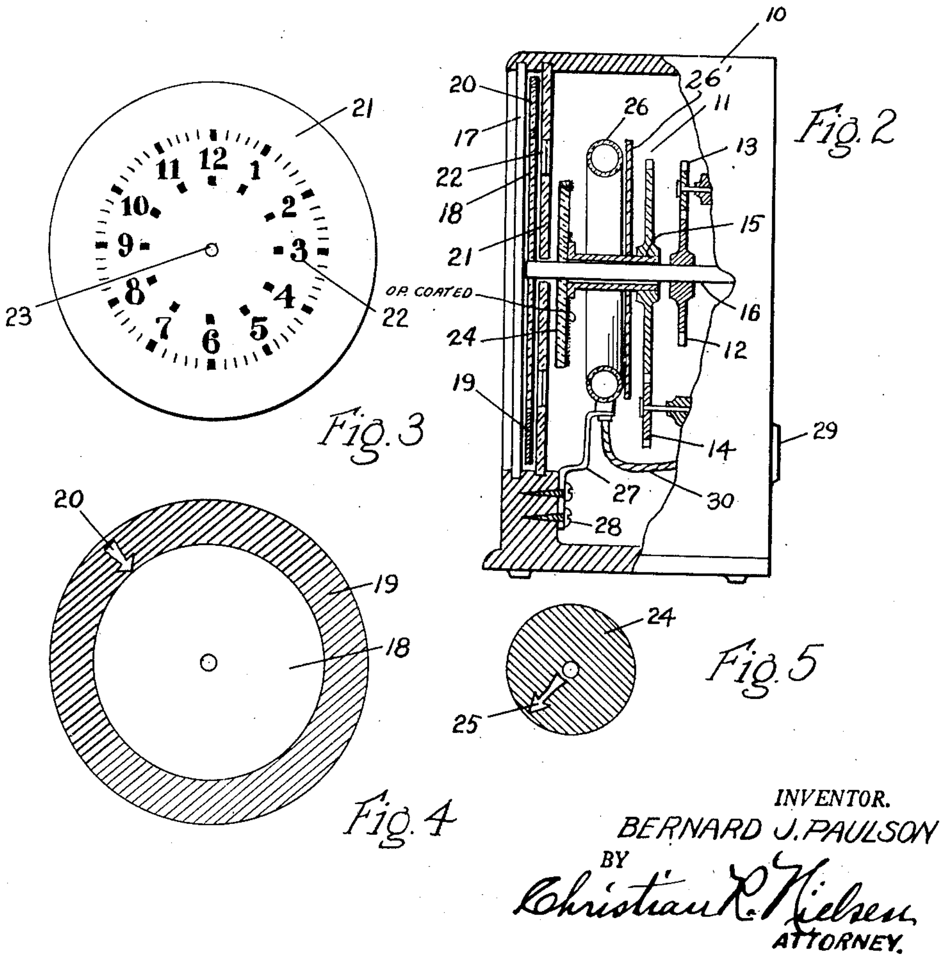
Figure 2 is a fragmentary, cross-sectional view of the entire clock assembly, as shown in Figure 1.
Figure 3 is a plan view of the numeral disc constructed of transparent material and showing the numerals applied thereto with opaque material.

Figure 4 is a plan view of the minute indicator disc made of a transparent material having an opaque circle on its outer edge, which circle is provided with a transparent portion to serve as the minute indicator, and Figure 5 is an hour indicator disc made of transparent material covered entirely by an opaque coating leaving only a portion thereof transparent, which portion acts as the hour indicator.

The arrangement shown provides a structure having revolving discs adjacent to one another and to the stationary numeral disc, permitting only the transparent portion of the discs to reflect the illumination through its face.

Similar characters of reference indicate corresponding parts throughout the several views, and referring now to the same, the character 10 shows a body structure serving as an enclosure or housing for a conventional clock mechanism portrayed in part by the gears and pinions 11, 12, 13 and 14. The gear 11 is shown mounted on a tubular shaft 15, which is rotatably mounted on a shaft 16 shown driven by the gear 12. The entire enclosure 10 is shown sealed at its forward face by a transparent disc 17. This disc 17 may be clear or of a semi-translucent nature. The forward end of the main shaft 16 is provided with a revolving disc 18, as shown in Figure 4, which is constructed of a transparent material having an opaque portion 19 on which the indicator arrow is left transparent. Immediately behind this revolving disc 18, is a stationary disc 21, as shown in Figure 3, made of a transparent material on which numerals 22 in opaque are applied. This disc 21 is shown supported by the enclosure 10 in very much the same manner as the disc 17 is supported, and is provided with an aperture 23 at its center through which the main shaft 16 is permitted to protrude. The numerals 22 may be applied, as shown, or may be in reverse, that is, the numerals may be transparent against an opaque background.

There is another revolving disc 24 attached to the tubular shaft 15. This disc 24 is shown disposed behind the stationary disc 21. It is constructed of transparent material covered almost entirely by an opaque coating with the exception of a portion forming an arrow acting as an hour indicator 25 which is left transparent.

At a point between the disc 24 and the clock driving mechanism, shown by the gears 11, 12, 13 and 14, is shown an illuminating means 26 in the form of a fluorescent tube encircling the shafts 15 and 16, and supported to a bracket 27 attached to the body portion of the enclosure 10 by means of screws 28 or in any other convenient manner. If desirable, a reflector 26' may be inserted behind the illuminating means 26 to direct the rays of light toward the plurality of discs, and as these discs 18, 21 and 24 have only certain portions thereof left transparent, only these portions will be visible at the face and will be illuminated by the illuminating means 26.

If the front disc 17 is of a semi-translucent nature, the light of the transparent portions only will be reflected thereon.

The illuminating means 26 is shown connected to an attachment plug 29 by means of wires 30 and the entire device may be connected to a source of electric energy for the actuation of the clock movement as well as the illumination of the tube 26.

It is manifest to anyone familiar with the art that the arrangement of the revolving discs in relation to the stationary numerals may be varied to suit their requirements. In the sequence shown, the minute indicator ahead of the numeral disc and the hour indicator behind the numeral disc, affords close relation of the indicators with the numerals.

Also, the color scheme of the numerals, whether they be positive or in reverse, may be of any desired construction. This feature also applies to the indicators, thus the numerals may be yellow and the indicators red, or one may be red and the other green, and if desirable, the arrangement shown also permits the face disc 17 on the enclosure 10 to be hinged permitting a colored sheet of transparent Celluloid or the like to be applied to its inside face in a manner to permit its being removed, thereby providing a clock face that may be made less conspicuous or visible at night in a sickroom or the like.

While I have herein described my invention and illustrated a specific construction thereof, I am fully aware that many changes in the form and arrangement of the various parts can be made, and I reserve the right to make such changes as I deem necessary and convenient without affecting the spirit of the invention or the scope of the appended claim.

Having thus described my invention, what I claim and desire to secure by Letters Patent in the United States is:

A device of the character described, comprising a stationary clock dial of transparent material, a revolving disc, said disc constructed of transparent material having an opaque surface near its outer peripheral edge, which opaque surface is in alignment with the outer edge of the numerals on the clock dial, a transparent indicator disposed within said opaque surface, an auxiliary revolving disc, said auxiliary disc constructed of transparent material covered by an opaque surface, a transparent indicator disposed within the opaque surface of said auxiliary disc, said auxiliary disc of a size registering with the inner edge of the numerals of said clock dial, a pair of shafts, each revolving disc mounted on one of said shafts extending to the center of said discs, a clock mechanism, said clock mechanism arranged for actuating said shafts and an illuminating means encircling said shafts at a point between said discs and said clock mechanism, the entire device encased within an enclosure supplied with a source of electric energy for the energizing of said illuminating means.

BERNARD J. PAULSON.

REFERENCES CITED

The following references are of record in the file of this patent:

UNITED STATES PATENTS

| Number | Name | Date |
|---|---|---|
| 1,887,479 | Bulova | Nov. 8, 1932 |
| 1,950,189 | Pejchar | Feb. 6, 1934 |
| 2,009,209 | Scantlebury | July 23, 1935 |
| 2,380,171 | Hammer | July 10, 1945 |

FOREIGN PATENTS

| Number | Country | Date |
|---|---|---|
| 416 | Australia | Oct. 16, 1936 |
| 83,581 | Sweden | June 4, 1935 |